US007020142B2

(12) United States Patent
Kodaira

(10) Patent No.: US 7,020,142 B2
(45) Date of Patent: Mar. 28, 2006

(54) IP PACKET PRIORITY CONTROL SYSTEM

(75) Inventor: Tsutomu Kodaira, Kanagawa (JP)

(73) Assignee: NEC Corporation, Tokyo (JP)

( * ) Notice: Subject to any disclaimer, the term of this patent is extended or adjusted under 35 U.S.C. 154(b) by 872 days.

(21) Appl. No.: 09/862,470

(22) Filed: May 23, 2001

(65) Prior Publication Data
US 2001/0048663 A1 Dec. 6, 2001

(30) Foreign Application Priority Data
May 24, 2000 (JP) .............................. 2000-153064

(51) Int. Cl.
*H04L 12/56* (2006.01)
(52) U.S. Cl. .............................. 370/395.21; 370/230.1; 370/252; 370/392; 709/228; 709/240
(58) Field of Classification Search ........ 370/229–231, 370/395.2–395.4, 235, 238, 395.52
See application file for complete search history.

(56) References Cited

U.S. PATENT DOCUMENTS

| 6,141,686 A * | 10/2000 | Jackowski et al. .......... 709/224 |
| 6,671,724 B1 * | 12/2003 | Pandya et al. ............. 709/226 |
| 6,711,141 B1 * | 3/2004 | Rinne et al. ................. 370/328 |
| 2001/0023451 A1 * | 9/2001 | Hericourt .................... 709/232 |

FOREIGN PATENT DOCUMENTS

| JP | 08-070334 | 3/1996 |
| JP | 09-205461 | 8/1997 |
| JP | 11-027316 | 2/1999 |
| JP | 2000-78318 | 3/2000 |
| JP | 2001-156779 | 6/2001 |
| WO | WO 9905828 A1 * | 2/1999 |

(Continued)

OTHER PUBLICATIONS

Markku Kojo et al, Connecting Mobile Workstations to the Internet over a Digital Cellular Telephone Network, Sep. 1994, Department of Computer Science of University of Helsinki, Series of Publications C, Report C-1994-39.*

(Continued)

*Primary Examiner*—Brian Nguyen
*Assistant Examiner*—Tri H. Phan
(74) *Attorney, Agent, or Firm*—Whitham, Curtis, Christofferson & Cook P.C.

(57) ABSTRACT

An IP packet priority control system of the present invention transmits and receives an IP packet among a terminal on the Internet, a server, and a router operating under program control, and includes means for setting priority in an IP packet on a session-by-session basis in order to realize an IP packet priority control system which distributes load to hardware, performs priority control on a session-by-session basis, and causes no interference between images and control information. The session comprises a voice call, image data, and a JAVA applet of a browser. The IP packet priority is set such that the priority of control information of the voice call is high, the priority of the image data of the browser is low, and the priority of the JAVA applet is intermediate. The means for setting priority in an IP packet performs setting on a session-by-session basis in which a terminal or a server adds priority parameter passing to a standard API rather than setting on a port-by-port basis in which a router prioritizes control information with QoS control.

9 Claims, 2 Drawing Sheets

FOREIGN PATENT DOCUMENTS

WO        WO 9948310 A1 * 9/1999

OTHER PUBLICATIONS

Markku Kojo et al, Enhanced Communication Services for Mobile TCP/IP Networking, Apr. 1995, Department of Computer Science of University of Helsinki, Series of Publications C, Report C-1995-15.*

Jani Kiiskinen et al, Data Channel Service for Wireless Telephone Links, Jan. 1996, Department of Computer Science of University of Helsinki, Series of Publications C, Report C-1996-1.*

Japanese Office Action dated Nov. 12, 2003 with English translation of pertinent portions.

Article titled "Simplified Method for Session Coordination Using Three-level QOS Specification and Translation" vol. 39 No. 2; dated Feb. 1998. Nishio and Tokuda Japanese Notice of Rejection dated May 3, 1999.

* cited by examiner

IP PACKET PRIORITY CONTROL SYSTEM

BACKGROUND OF THE INVENTION

1. Field of the Invention

The present invention relates to an IP (Internet Protocol) packet priority control system on the Internet.

2. Description of the Related Art

Recently, the integration of data and sound is rapidly proceeding on IP networks for Internet terminals.

In the IP networks, image data is frequently handled steadily for browsing Web pages with browsers. The image data is included in an HTTP (Hypertext Transfer Protocol) transaction which is likely to substantially occupy a communication band. Thus, control information vulnerable to delay and sound data requiring real time processing exhibit phenomena such as data delay, fluctuations, data loss and the like on the networks due to the occupation of the communication band by the image data.

For example, these phenomena occur more prominently on wired networks in WAN (Wide Area Network) lines for connecting LANs (Local Area Network) as compared with LAN lines. This is because high cost of the WAN line for connecting LANs per band makes it difficult to ensure a sufficient band. For this reason, it is common practice to put high priority on control information with QoS (Quality of Service) control in a router connected to an exit of the WAN line.

On wireless networks, cellular phones play increasing roles as Internet terminals and image data is handled more frequently. However, a transmission speed based on current techniques has reached the limit to cause the aforementioned phenomena prominently at an exit of a wireless communication path where a sufficient band is difficult to ensure.

The prior art has problems as below.

A first problem is that while the mounting of a CPU of high performance is required in a cellular phone, it is difficult to mount such a CPU of high performance due to desires for a smaller size, lighter weight, and low current consumption of the cellular phone.

A second problem is that priority setting is realized only on an application-by-application basis in existing devices using Diff-serv (Differentiated services). This is because the implementation in one terminal is not considered.

SUMMARY OF THE INVENTION

It is an object of the present invention to provide an IP packet priority control system which performs priority control on a session-by-session basis by distributing load to hardware to cause no interference between images and control information.

The IP packet priority control system of the present invention for transmitting and receiving an IP packet among a terminal, a server, and a router on the Internet operating under program control is characterized by comprising means for setting priority in the IP packet on a session-by-session basis.

The sessions comprise a voice call, image data, and a JAVA applet of a browser.

The priority in the IP packet is set such that the priority of control information of the voice call is high, the priority of the image data of the browser is low, and the priority of the JAVA applet is intermediate between the control information and the image data.

The means for setting priority in an IP packet is characterized by performing setting on a session-by-session basis in which a terminal or a server adds priority parameter passing to a standard API (Application Programming Interface) rather than on a port-by-port basis in which a router puts priority on control information with QoS control.

The means for setting priority in an IP packet is characterized by performing setting such that, in a server including an application layer, a SOCKET layer, a TCP/UDP (Transmission Control Protocol/User Diagram Protocol) layer, an IIP layer, and an interface layer, the SOCKET adds priority parameter passing to a standard API for use on the Internet.

The present invention proposes an interface for passing a priority parameter including priority information, a port number, and IP address from the application, in contrast with a conventional Diff-serv which assigns priority to an IP packet.

The priority parameter passing in Diff-serv is performed at an interface position changed from conventional QoS priority on a port-by-port basis to QoS priority on a session-by-session basis of the present invention as shown in FIG. 1 showing a configuration of a terminal and a server for use on the Internet.

According to the present invention, Diff-serv control can be performed on a session-by-session basis by distributing load to hardware even with a CPU of low performance used in a cellular phone. The control enables communication without interference between images and control information.

According to the present invention, a first effect is to allow communication without interference by putting a higher priority on control information vulnerable to delay than image data which is likely to substantially occupy a communication band. This is because setting can be performed such that the priority of control information of a voice call is high, the priority of image data of a browser is low, and the priority of a JAVA applet is intermediate between the control information and the image data.

A second effect is to allow Diff-serv control on a session-by-session basis even with a low-performance CPU. This is because Diff-serve control is performed not by software processing with a CPU but by distributing load to hardware processing faster than a CPU.

DESCRIPTION OF THE PREFERRED EMBODIMENT

Next, an embodiment of the present invention is described in detail with reference to the drawings.

Figure 1:
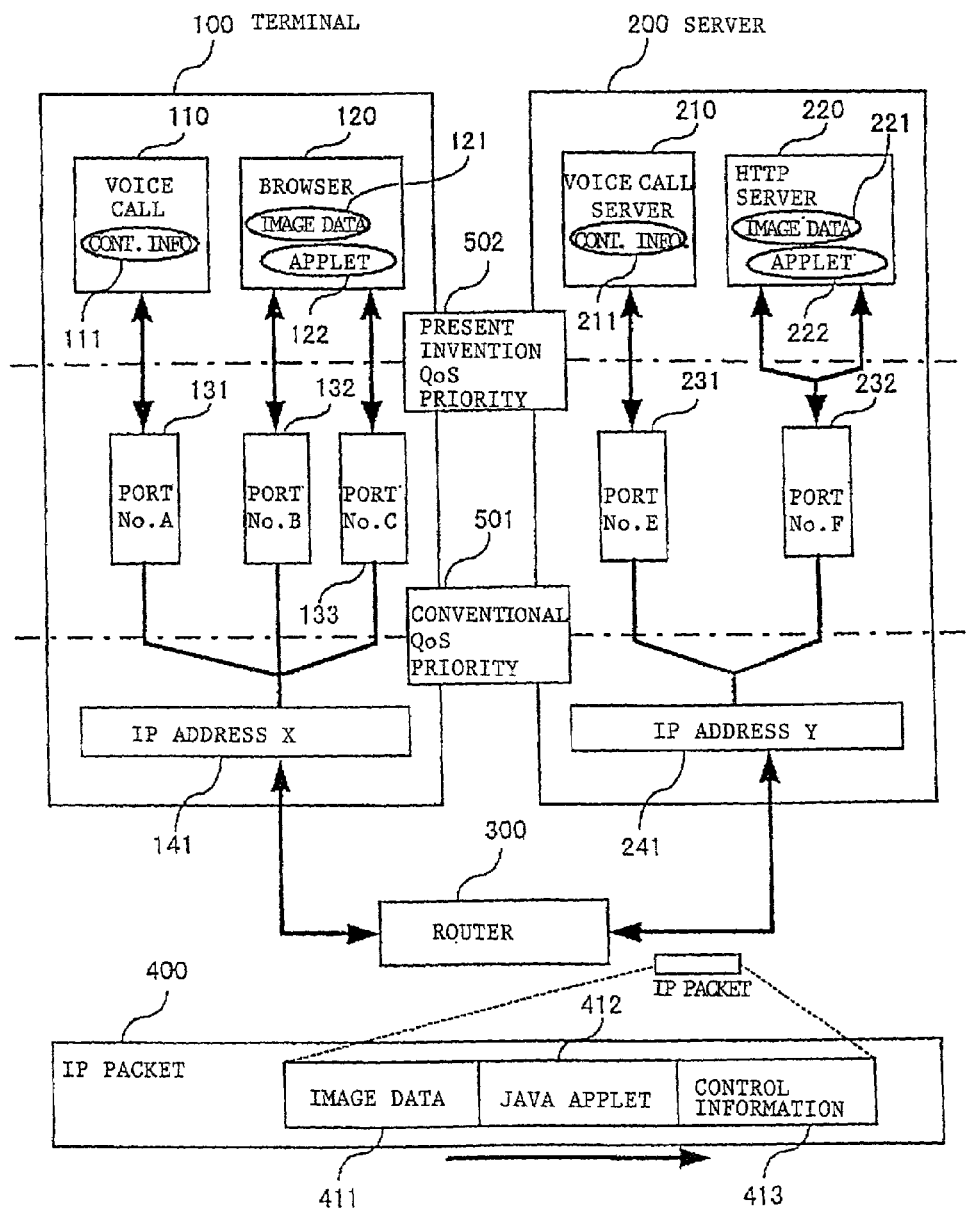
FIG. 1 shows an embodiment of the present invention comprising a terminal for use on the Internet, a server, and a router, and further illustrates an IP packet transmitted and received on an IP network, an interface position of conventional QoS priority, and an interface position of QoS priority of the present invention where QoS priority in an IP packet is set.

Referring to FIG. 1, an embodiment of the present invention comprises terminal 100 operating under program control for use on the Internet, server 200, and router 300. FIG. 1 also shows IP packet 400 transmitted and received on an IP network, conventional QoS priority 501, and QoS priority 502 of the present invention indicating interface positions where QoS priority in IP packet 400 is set.

Terminal 100 includes voice call 110 of a client application, browser 120, port number A 131, port number B 132, port number C 133 used from the application, and IP address X 141. Voice call 110 of the application includes control information 111 treated as information. Browser 120 of the application includes image data 121 treated as information and JAVA applet 122.

Server 200 includes voice call server 210 of a server application, HTTP server 220, port number E 231 and port number F 232 used from the application, and IP address Y 241. Voice call server 210 of the application includes control information 211 treated as information. HTTP server 220 of the application includes image data 221 treated as information and JAVA applet 222.

Router 300 relays IP packet 400 between terminal 100 and server 200.

IP packet 400 includes JAVA applet 412 for the IP packet of information including priority, image data 411, and control information 413.

They are operated as follows.

For voice call 110, control information 111 is acquired from control information 211 of voice call server 210 by using control information 413.

For browser 120, image data 121 is acquired from image data 221 of HTTP server 220 by using image data 411, and JAVA applet 122 is acquired from JAVA applet 222 of HTTP server 220 by using JAVA applet 412.

Next, the entire operation in the embodiment is described in detail with reference to FIG. 1. First, in terminal 100, priority in an IP packet is passed from QoS priority 502 of the present invention to three sessions of voice call 110, image data 121, and JAVA applet 122 of browser 120, and information included in IP packet 400 is transmitted and received in accordance with the priority in the IP packet as follows.

The session of voice call 110 transmits and receives control information 413 by using port number E231 of the server from port number A 131.

One session of browser 120 transmits and receives JAVA applet 412 by using port number F 232 of the same HTTP server 220 as image data 411 from port number C 133.

The other session of browser 120 transmits and receives image data 411 by using port number F 232 of HTTP server 220 from port number B 132.

Figure 2:
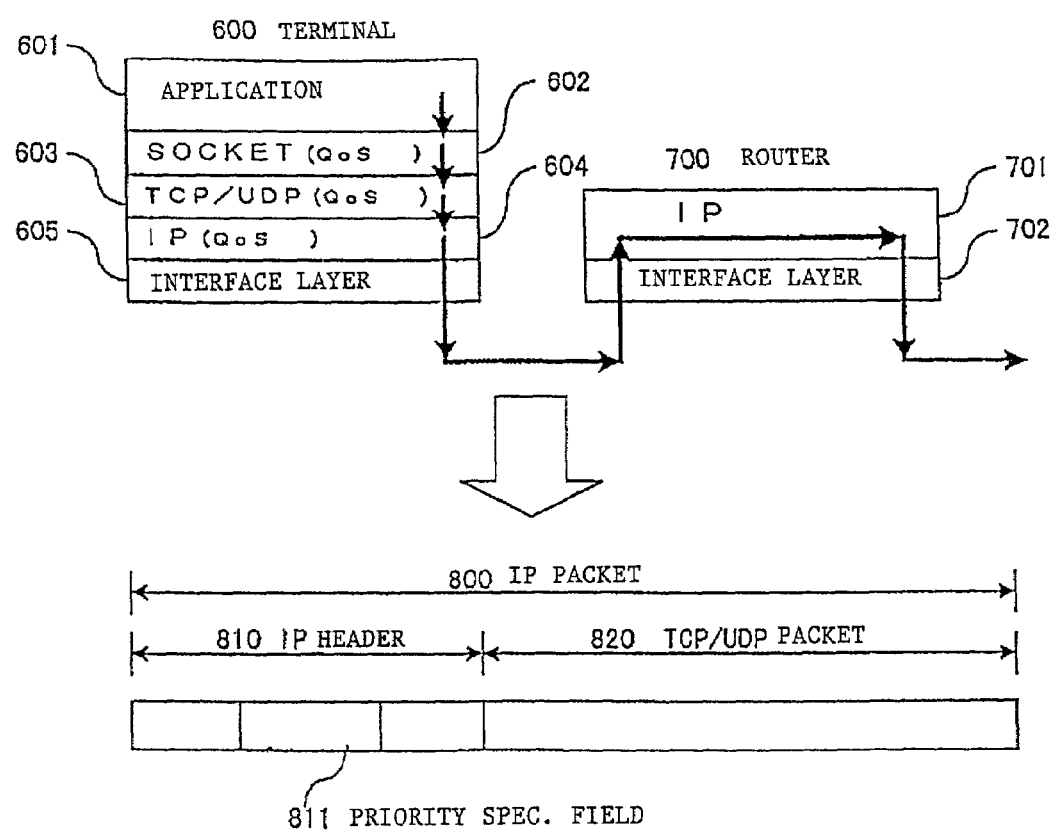
FIG. 2 shows a terminal and a router of the embodiment for use on the Internet, and an IP packet transmitted and received between the terminal and the router, for illustrating QoS transmission on a session-by-session basis.

Next, the embodiment of the present invention is described with reference to FIG. 2 in detail for the transmission and reception of an IP packet between the terminal and the router. Referring to FIG. 2, terminal 600 operating under program control for use on the Internet, router 700, and IP packet 800 transmitted and received between the terminal and the router in the embodiment are shown.

Terminal 600 includes application 601, SOCKET (supporting QoS) 602, TCP/UDP (supporting QoS) 603, IP (supporting QoS) 604, and interface layer 605.

Router 700 includes IP 701 and interface layer 702. IP packet 800 includes IP header 810 and TCP/UDP packet 820. IP header 810 includes priority specification field 811.

They are operated as follows.

Application 601 is an application for a browser or voice call and transmits IP packet 800 to a terminal ahead of router 700.

SOCKET (supporting QoS) 602 is a standard API for use on the Internet plus the function of passing a priority parameter, and passes data and a priority parameter from application 601 to TCP/UDP (supporting QoS) 603.

TCP/UDP (supporting QoS) 603 is a standard TCP/UDP protocol for use on the Internet plus the function of passing a priority parameter, and passes the data and priority parameter from SOCKET (supporting QoS) 602 to IP (supporting QoS) 604.

IP (supporting QoS) 604 is a standard IP protocol for use on the Internet plus the function of passing a priority parameter, and sets the data from TCP/UDP (supporting QoS) 603 in TCP/UDP packet 820, sets the priority parameter in priority specification field 811 of IP header 810, and passes it to interface layer 605.

Interface layer 605 transmits IP packet 800 from IP (supporting QoS) 604.

What is claimed is:

1. An IP (Internet Protocol) packet priority control system which performs priority control on a session-by-session basis by distributing load to hardware to enable communication without interference between images and control information comprising:

a network, operating under program control;

a terminal, a server, and a router connected to said network; and means for a Quality of Service (QoS) setting priority in an IP packet on a session-by-session basis in which the terminal or the server adds a priority parameter passing to a standard Application Programming Interface (API), and wherein said priority parameter including priority information, a port number and IP address from an application with a higher priority on control information vulnerable to delay than image data, and wherein the IP packet is transmitted and received under priority control among said terminal, said server, and said router.

2. The IP packet priority control system according to claim 1, wherein said session comprises sessions of a voice call, image data, and a JAVA applet of a browser.

3. The IP packet priority control system according to claim 2, wherein the priority in said IP packet is set such that priority of control information of a voice call is high, priority of image data of a browser is low, and priority of a JAVA applet is intermediate between said control information and said image data.

4. The IP packet priority control system according to claim 1, wherein said means for setting priority in the IP packet performs setting on a session-by-session basis in which the terminal or the server adds priority parameter passing to a standard API rather than on a port-by-port basis in which the router prioritizes control information with QoS (Quality of Service) control.

5. The IP packet priority control system according to claim 4, wherein said means for setting priority in the IP packet performs setting such that, in a the terminal including an application layer, a SOCKET layer, a TCP/UDP (Transmission Control Protocol/User Diagram Protocol) layer, an IP layer, and an interface layer, said SOCKET adds priority parameter passing to a standard API for use on the network.

6. The IP packet priority control system according to claim 1, wherein said means for setting priority in the IP packet performs setting such that, in the server including application layer, a SOCKET layer, a TCP/UDP layer, an IP layer, and an interface layer, said SOCKET adds priority parameter passing to a standard API for use on the network.

7. The Internet Protocol (IP) control method according to claim 1, wherein said session comprises sessions of a voice call, image data , and a JAVA applet of a browser.

8. The Internet Protocol (IP) control method according to claim 7, wherein the priority in said IP packet is set such that priority of control information of a voice call is high, priority of image data of a browser is low, and priority of a JAVA applet is intermediate between said control information and said image data.

9. An Internet Protocol (IP) control method which performs priority control on a session-by-session basis by distributing load to hardware to enable communication without interference between images and control information comprising the steps of:

transmitting and receiving an IP packet among a terminal, a server and a router on a network operating under program control; and setting a Quality of Service (QoS) priority in the IP packet on a session-by-session basis in which the terminal or the server adds a priority parameter passing to a standard Application Programming Interface (API), said priority parameter including priority information, a port number and IP address from an application with a higher priority on control information vulnerable to delay than image data.

* * * * *